(12) United States Patent
Matsumaru

(10) Patent No.: US 7,269,140 B2
(45) Date of Patent: Sep. 11, 2007

(54) SUSPEND PACKET TRANSMITTER

(75) Inventor: Makoto Matsumaru, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1138 days.

(21) Appl. No.: 10/046,160

(22) Filed: Jan. 16, 2002

(65) Prior Publication Data
US 2002/0097676 A1    Jul. 25, 2002

(30) Foreign Application Priority Data
Jan. 22, 2001    (JP)    ............................. 2001-013333

(51) Int. Cl.
*G01R 31/08* (2006.01)
(52) U.S. Cl. ................. 370/236; 370/318; 370/401
(58) Field of Classification Search .............. 370/236
See application file for complete search history.

(56) References Cited

U.S. PATENT DOCUMENTS

| | | | |
|---|---|---|---|
| 5,170,471 A * | 12/1992 | Bonevento et al. ............ | 710/17 |
| 5,940,861 A * | 8/1999 | Brown et al. ................ | 711/154 |
| 6,105,097 A * | 8/2000 | Larky et al. ................. | 710/314 |
| 6,363,085 B1 * | 3/2002 | Samuels ....................... | 370/502 |
| 6,628,607 B1 * | 9/2003 | Hauck et al. ................ | 370/216 |
| 6,795,450 B1 * | 9/2004 | Mills et al. .................. | 370/463 |

OTHER PUBLICATIONS

"High Performance Serial Bus, Suspend/Resume Proposal 97-031, Draft Revision 0.09", IEEE P1394PMTASK Force, Oct. 16, 1997, pp. 2-22, XP0002252002.
"IEEE Standard For A High Performance Serial Bus—Amendment 1", IEEE STD 1394A-2000, vol. 5.0, Mar. 30, 2000, pp. 21, 22, 54, 166, XP002252003.
"1394 Trade Associates Power Specification Part 2: Suspend/Resume Implementation Guidelines", vol. 1.0, Oct. 5, 1999, XP002156050.

* cited by examiner

*Primary Examiner*—Chau Nguyen
*Assistant Examiner*—Kenneth R Hartmann
(74) *Attorney, Agent, or Firm*—Sughrue Mion, PLLC

(57) ABSTRACT

For executing setting suspend and resume securely, a suspend packet transmitter includes a device status checking unit for checking whether or not a device connected with a communication network fulfills suspend and resume function; a judging unit for judging with reference to data in said device status checking unit whether or not a device without suspend and resume function exists in a domain set in suspend state by means of inputted suspend device number and port number; and a packet transmitting unit for transmitting a suspend packet with said inputted suspend device number and port number when all devices are judged as devices with suspend and resume function in said judging unit.

7 Claims, 4 Drawing Sheets

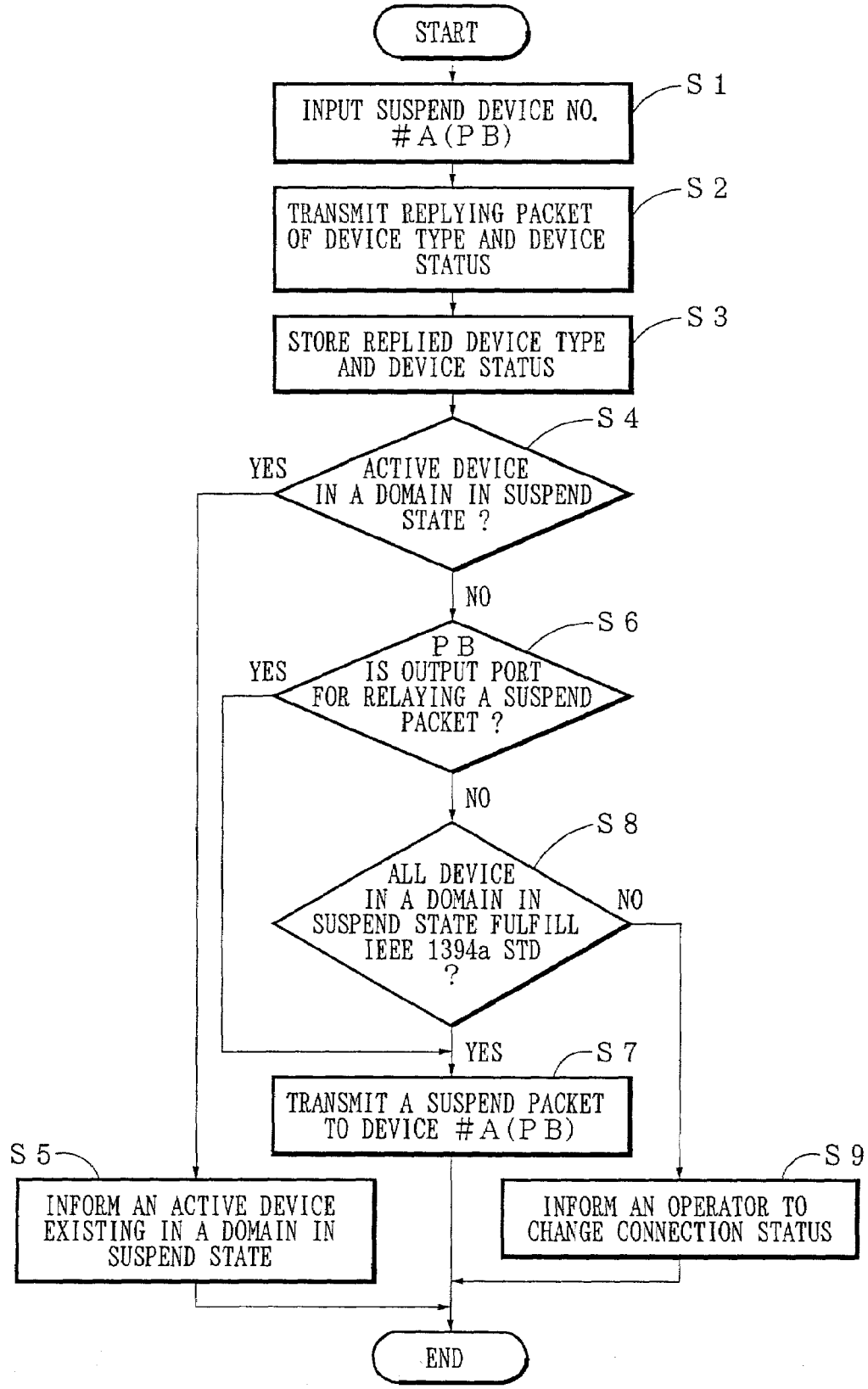

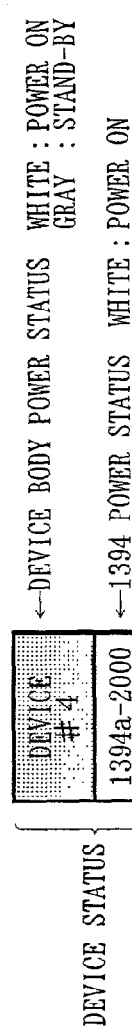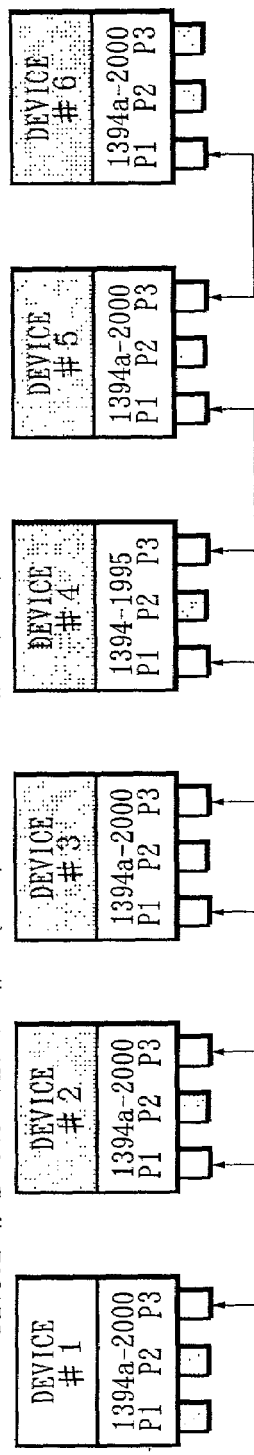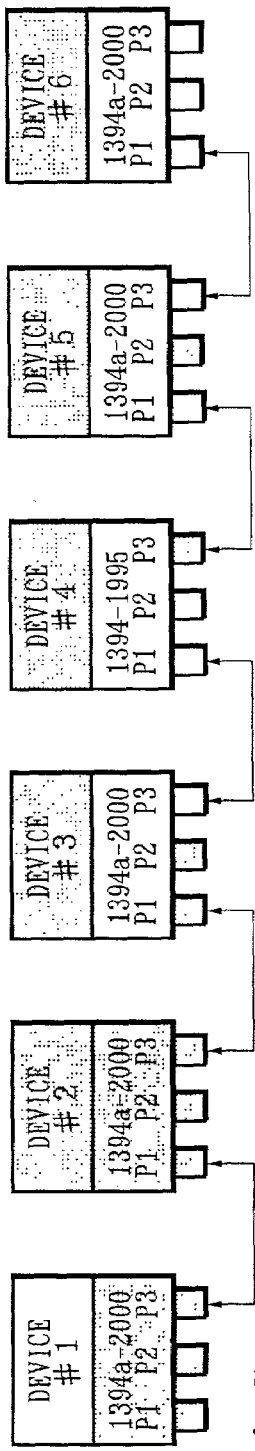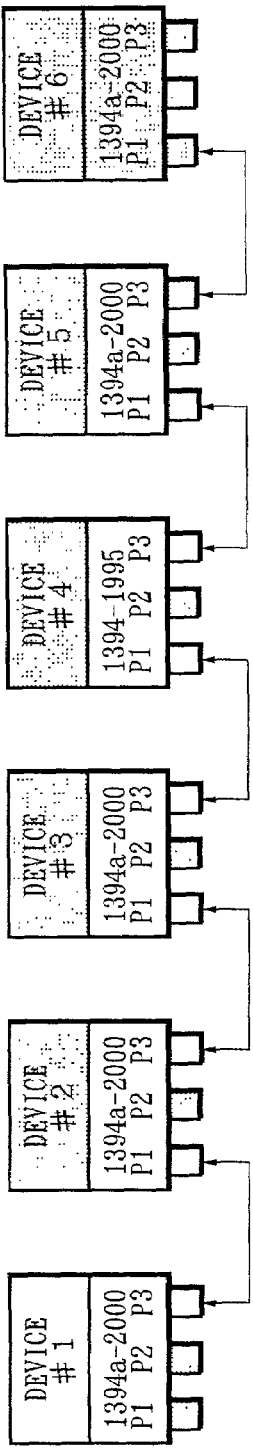
FIG. 3A  FIG. 3B  FIG. 3C

FIG. 4A
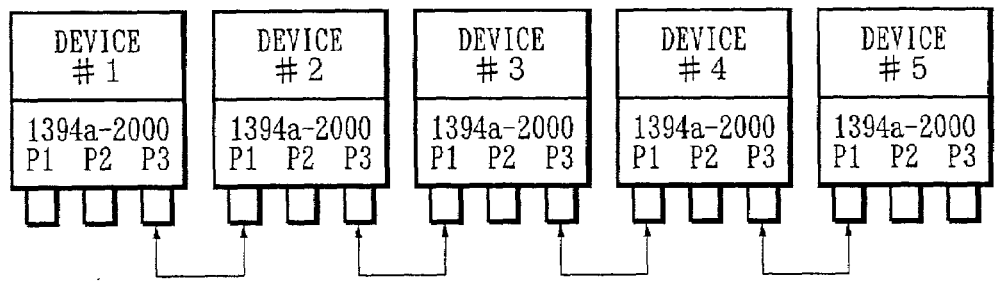
FIG. 4B1
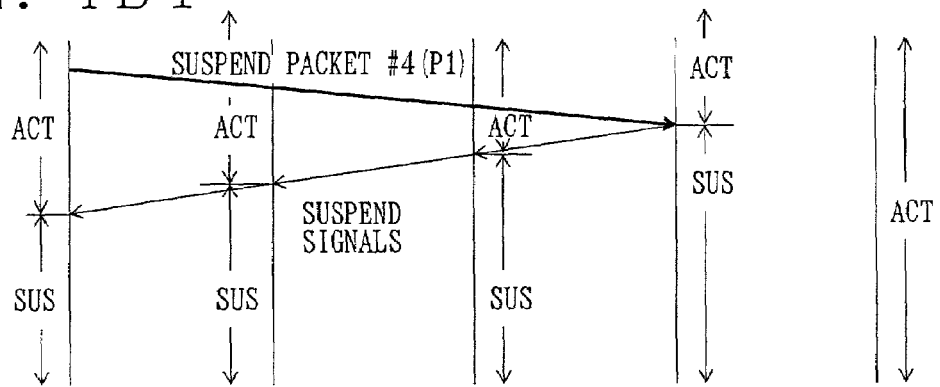
FIG. 4B2
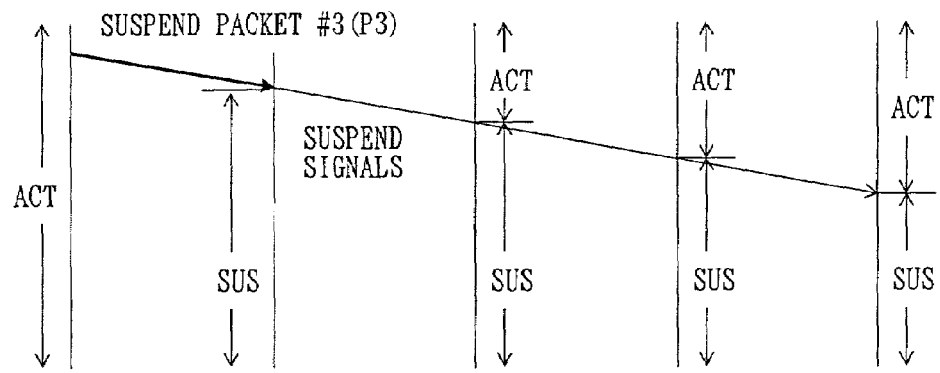
FIG. 4C
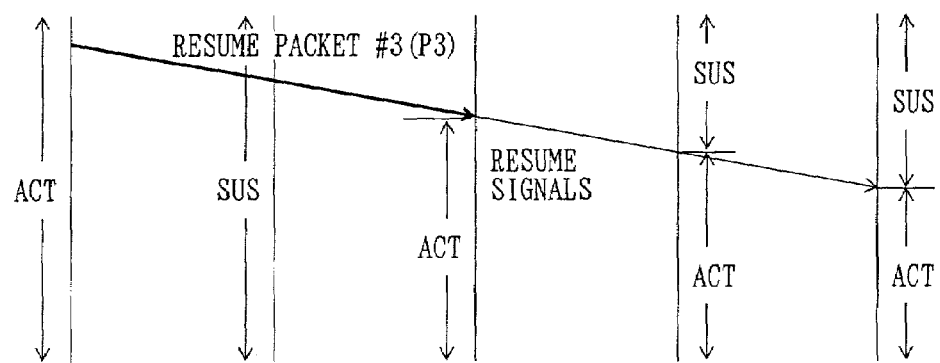

SUSPEND PACKET TRANSMITTER

BACKGROUND OF THE INVENTION

1. Field of the Invention

This invention relates to a suspend packet transmitter for transmitting suspend packets, specified in IEEE.

2. Description of the Related Art

IEEE in the United States of America has IEEE1394-1995 standard for packet communication since long ago and has IEEE1394a-2000 standard, revised above standard.

IEEE1394a-2000 standard specifies suspend function for setting a port in stand-by state to reduce electric power consumption and resume function for resetting a port from stand-by state. Other IEEE1394-1995 standard does not specify suspend and resume function.

In case of devices #1-#5, fulfilling IEEE1394a-2000 standard, connected together through port P3 and port P1 respectively as shown in FIG. 4A, when device #1 sends a suspend packet for port P1 of device #4 as shown in FIG. 4B1, the port P1 of the device #4 sends the suspend packet to device #3 and is set from active state to suspend state. When the device #3 receives a suspend signal, the device #3 sends a suspend signal to device #2 and all ports of device #3 is set from active state to suspend state. Thereafter, respective device sends a suspend signal in sequence and when the device #1 receives a suspend signal, port P3 of the device #1 is set from active state to suspend state.

When the device #1 sends a suspend packet for port P3 of the device #2 as shown in FIG. 4B2, the port P3 of the device #2 sends a suspend signal to device #3 and is set from active state to suspend state. Thereafter, respective device sends a suspend signal in sequence and when the last device #5 receives a suspend signal, port P1 of the device #5 is set from active state to suspend state.

When the device #1 sends a resume packet for port P3 of the device #3 as shown in FIG. 4C, the port P3 of the device #3 sends a resume signal to the device #4 and is set from suspend state to active state. Thereafter, respective device sends a resume signal in sequence and devices in order are set from suspend state to active state.

Objects to be Solved

If devices #3 shown in FIG. 4A fulfills IEEE1394-2000 standard, when device No. 1 sets port P1 of device #4 in suspend state, the device #1 sends a suspend packet to the port P1 of device #4. After the port P1 of device #4 receives the suspend packet, device #4 tries to set opposed port P3 of device #3 in suspend state. However, device #3 (fulfilling IEEE1394-2000 standard) does not work for suspend and resume function and then port 3 of the device #3 is not set in suspend state and only port 1 of device #4 is set in suspend state. Therefore, device #4 is disconnected with a communication network and then only devices #1-#3 are connected in the communication network.

When device #1 sets device #4 in resume state, the device #1 sends a resume packet to port P3 of device #3. However, device #3 does not fulfill suspend and resume function, so that device #3 can not set device #4 in resume state when the device #3 receives the packet. Therefore, device #1 can set device #4 in suspend state, but can not set device #4 in resume state.

There may be such problem when a device without suspend and resume function is connected between a device transmitting a suspend and a resume packet, and a device receiving the packet.

Therefore, an object of the invention is to provide a suspend packet transmitter for executing suspend and resume setting securely.

SUMMARY OF THE INVENTION

How to Attain the Object

In order to attain the objects, a suspend packet transmitter, according to an aspect of the invention, includes a device status checking unit for checking whether or not a device connected with a communication network fulfills suspend and resume function; a judging unit for judging with reference to data in said device status checking unit whether or not a device without suspend and resume function exists in a domain set in suspend state by means of inputted suspend device number and port number; and a packet transmitting unit for transmitting a suspend packet with said inputted suspend device number and port number when all devices are judged as devices with suspend and resume function in said judging unit.

The suspend packet transmitter, according to other aspect of the invention, includes the suspend packet transmitter as referred to above, wherein when the inputted port number of the inputted suspend device number corresponds to a port to output the relaying suspend packet, the suspend packet is outputted even if there is included in a domain to be suspended a device other than a device with suspend and resume function.

The suspend packet transmitter, according to yet other aspect of the invention, includes the suspend packet transmitter as referred to above, wherein said device status checking unit checks whether or not each device is in active, wherein said judging unit judges whether or not any active device exists in the domain set in suspend state, and wherein said packet transmitting unit stops to transmit a suspend packet when it is judged that an active device exists in the domain.

The suspend packet transmitter, according to further aspect of the invention, includes the suspend packet transmitter as referred to above, wherein when it is judged at said judging unit that a device other than a device with suspend and resume function exists in the domain, it is informed that there is included the device other than the device with suspend and resume function exists in the domain.

The suspend packet transmitter, according to further aspect of the invention, includes the suspend packet transmitter as referred to above, wherein when it is judged at said judging unit that an active device exists in the domain, it is informed that there is the active device being in the domain.

The suspend packet transmitter, according to further aspect of the invention, includes the suspend packet transmitter as referred to above all, wherein said device with suspend and resume function fulfills IEEE1394a-2000 standard.

As mentioned above, a suspend packet transmitter includes a device status checking unit for checking whether or not a device connected with a communication network fulfills IEEE1394a standard; a judging unit for judging with reference to data in said device status checking unit whether or not a device other than a device fulfilling IEEE1394a standard exists in a domain set in suspend state by means of inputted suspend device number and port number; and a packet transmitting unit for transmitting a suspend packet with said inputted suspend device number and port number when all devices are judged as a devices fulfilling IEEE1394a at said judging unit, so that setting in suspend state and resume state can be done securely.

Although the present invention has been fully described by way of examples with reference to the accompanying drawings, it is to be noted that various change and modifications can be made with the scope of the present invention. Incidentally, the content of Japanese Patent Application No. 2001-13333 is hereby incorporated by reference.

BRIEF DESCRIPTION OF THE DRAWINGS

FIG. 2 is a an operation flow chart of an embodiment of this invention;

FIGS. 3A, 3B and 3C are schematic diagrams for describing examples of operations of an embodiment of this invention;

FIG. 4A is a schematic diagram for describing operations of devices by prior art connected with a network; and FIGS. 4B1, 4B2 and 4C are device status charts for describing operations of suspend and resume.

DESCRIPTION OF THE PREFERRED EMBODIMENT

Figure 1:
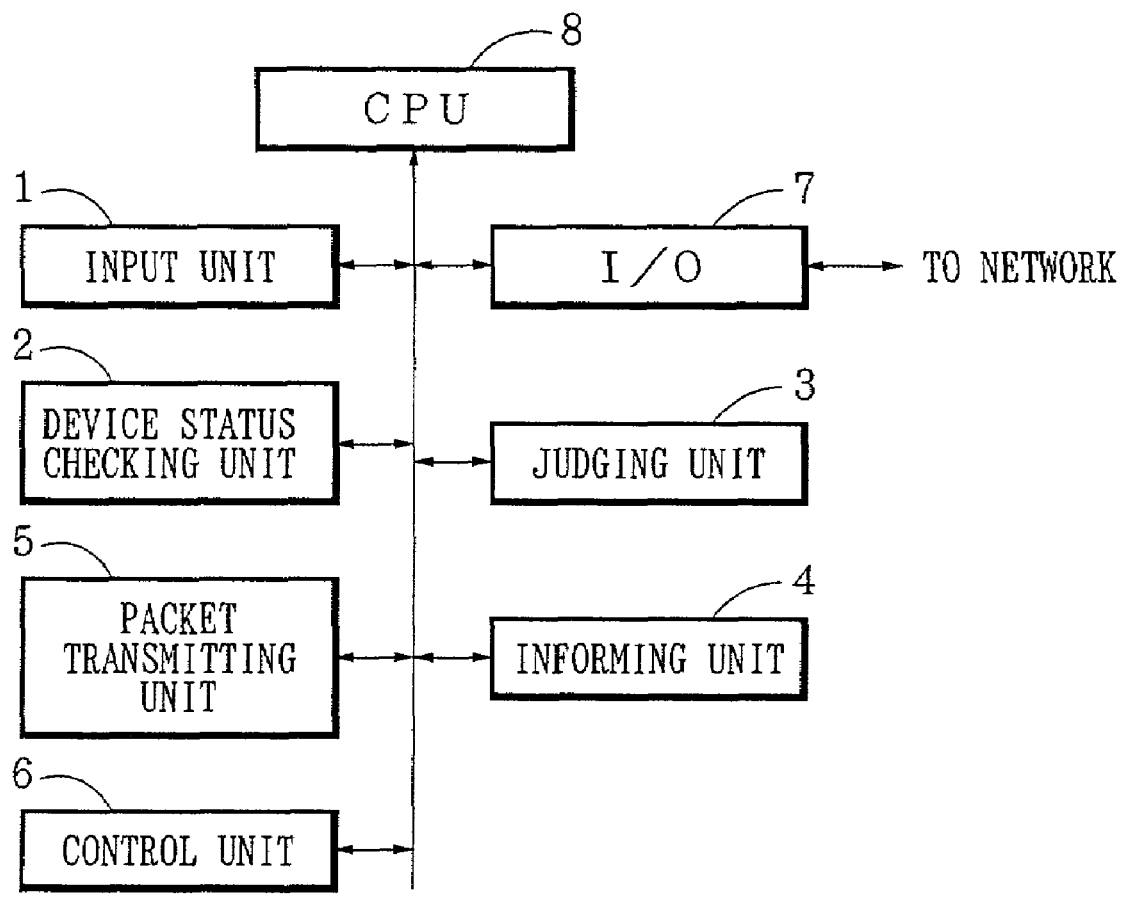
FIG. 1 is a schematic diagram of an embodiment of this invention.

A suspend packet transmitter according to an embodiment of this invention will now be described with reference to FIGS. 1 and 2. FIG. 1 is a schematic diagram of an embodiment of this invention. FIG. 2 is an operation flow chart of an embodiment of this invention.

In FIG. 1, mark 1 is a input unit, mark 2 is a device status checking unit, mark 3 is a judging unit, mark 4 is a informing unit, mark 5 is a packet transmitting unit, mark 6 is a control unit, mark 7 is an interface (I/O), and mark 8 is a processor for processing (CPU).

Operation of a suspend packet transmitter according to an embodiment of this invention will now be described with reference to FIG. 2.

In step S1, a suspend device number (#A) and a port number (PB) are inputted by an operator.

In step S2, a device status checking unit 2 transmits a packet for getting reply of a device type and current device status to all devices connected with a communication network and, proceeding to step S3, the device status checking unit stores the data of a device type and device status replied by respective devices.

In step S4, a judging unit 3 judges whether or not an active device is in a domain set in suspend state by suspend device number (#A) and port number (#B) inputted in step S1. If an active device is in the domain, proceeding to step S5, and a control unit 6 sends a command to a informing unit 4 to inform an active device existing in a domain in suspend state to an operator and the process finishes.

Regarding a domain set in suspend state in step S4, it is judged whether the inputted port number (PB) of the inputted suspend device number (#A) in step S1 corresponds to an input port or an output port for relaying the suspend packet, later described. All devices, connected between the device transmitting the suspend packet and a device by the suspend device number (#A) inputted instep S1, makes a domain in suspend state when the port is an input port. All devices connected behind a device by the suspend device number (#A) inputted in step S1 makes a domain in suspend state when the port is an output port.

When no active device exists in the domain in step S4, proceeding to step S6, the judging unit 3 judges whether the port number (PB) inputted in step S1 corresponds to an input port or an output port for relaying the suspend packet. When the port is an output port, proceeding to step S7, the packet transmitting unit 5 transmits a suspend packet to the device corresponding to the suspend device number (#A) inputted through I/O 7 into the network in step S1 for setting the port (PB) in suspend state and the process finishes.

When the port is an input port in step S6, proceeding to step S8, the judging unit judges whether or not all devices in the domain set in suspend state fulfills IEEE1394a-2000 standard. If the judgement is Yes, proceeding to step S7, the packet transmitting unit 5 transmits a suspend packet to the device corresponding to the suspend device number (#A) inputted through I/O 7 into the network in step S3 for setting the port (PB) in suspend state and the process finishes.

When a device other than a device fulfilled IEEE1394a-2000 standard, such as a device fulfilled IEEE1394-1995 standard, exists in the domain set in suspend state in step S8, proceeding to step S9, the informing unit 4 informs an operator to change a connecting condition and the process finishes.

In other words, when devices are connected as shown in FIG. 3A and device #1 tries to set the device #5 (P1) in suspend state, the port P1 of the device #5 is an input port for receiving a packet transmitted by the device #1 so that the domain set in suspend state is from the device #1 to the device #4 and the device #4 does not fulfill IEEE1394a-2000 standard and then the device #4 stops to set the device #5 in suspend state.

When the device #1 tries to set the device #3 (P3) in suspend state, the port P3 of the device #3 is an output port for relaying a packet transmitted by the device #1 so that the domain set in suspend state is from the device #4 to the device #6 and the device #4 does not fulfill IEEE1394a-2000 standard and then transmitting a suspend packet sets only the port P3 of the device #3 in suspend state.

When the device #1 tries to set the device #3 (P1) in suspend state, the port P1 of the device #3 is an input port for receiving a packet transmitted by the device #1 so that the domain set in suspend state is from the device #1 to the device #2 and all devices in the domain fulfills IEEE1394a-2000 standard and then respective port P1 of the devices #1, #2 and #3 is set in suspend state as shown in FIG. 3B.

When the device #1 tries to set the device #5 (P3) in suspend state, the port P3 of the device #5 is an output port for relaying a packet transmitted by the device #1 so that respective port P3 of the devices #5 and #6 is set in suspend state as shown in FIG. 3C.

What is claimed is:

1. A suspend packet transmitter, comprising:
   a device status checking unit for checking whether a device connected with a communication network fulfills suspend and resume function;
   a judging unit for judging, with reference to data in said device status checking unit, whether a device without suspend and resume function exists in a domain set in the suspend state by means of input suspend device number and port number; and
   a packet transmitting unit for transmitting a suspend packet with said input suspend device number and port number when all devices are judged as devices with suspend and resume function in said judging unit,
   wherein when it is judged at said judging unit that a device other than a device with suspend and resume function exists in the domain, it is informed that there is included the device other than the device with suspend and resume function existing in the domain.

2. A suspend packet transmitter, comprising:
a device status checking unit for checking whether a device connected with a communication network fulfills suspend and resume function;
a judging unit for judging, with reference to data in said device status checking unit, whether a device without suspend and resume function exists in a domain set in the suspend state by means of input suspend device number and port number; and
a packet transmitting unit for transmitting a suspend packet with said input suspend device number and port number when all devices are judged as devices with suspend and resume function in said judging unit,
wherein said device status checking unit checks whether each device is inactive, wherein said judging unit judges whether any active device exists in the domain in suspend state, and wherein said packet transmitting unit stops to transmit a suspend packet when it is judged that an active device exists in the domain,
wherein when it is judged at said judging unit that an active device exists in the domain, it is informed that there is the active device being in the domain.

3. The suspend packet transmitter according to claim 1 or 2, wherein said device with suspend and resume function fulfills IEEE 1394a-2000 standard.

4. The suspend packet transmitter according to claim 1, wherein when the input port number of the input suspend device number corresponds to an output port for relaying the suspend packet, the suspend packet is output even if there is included in a domain to be suspended a device other than a device with suspend and resume function.

5. The suspend packet transmitter according to claim 1, wherein said device status checking unit checks whether each device is inactive, wherein said judging unit judges whether any active device exists in the domain in suspend state, and wherein said packet transmitting unit stops to transmit a suspend packet when it is judged that an active device exists in the domain.

6. The suspend packet transmitter according to claim 4, wherein said device status checking unit checks whether each device is inactive, wherein said judging unit judges whether any active device exists in the domain in suspend state, and wherein said packet transmitting unit stops to transmit a suspend packet when it is judged that an active device exists in the domain.

7. The suspend packet transmitter according to claim 2, wherein when the input port number of the input suspend device number corresponds to an output port for relaying the suspend packet, the suspend packet is output even if there is included in a domain to be suspended a device other than a device with suspend and resume function.

* * * * *